(No Model.) 3 Sheets—Sheet 2.
P. FRANKE.
CANDY MACHINE.
No. 550,445. Patented Nov. 26, 1895.
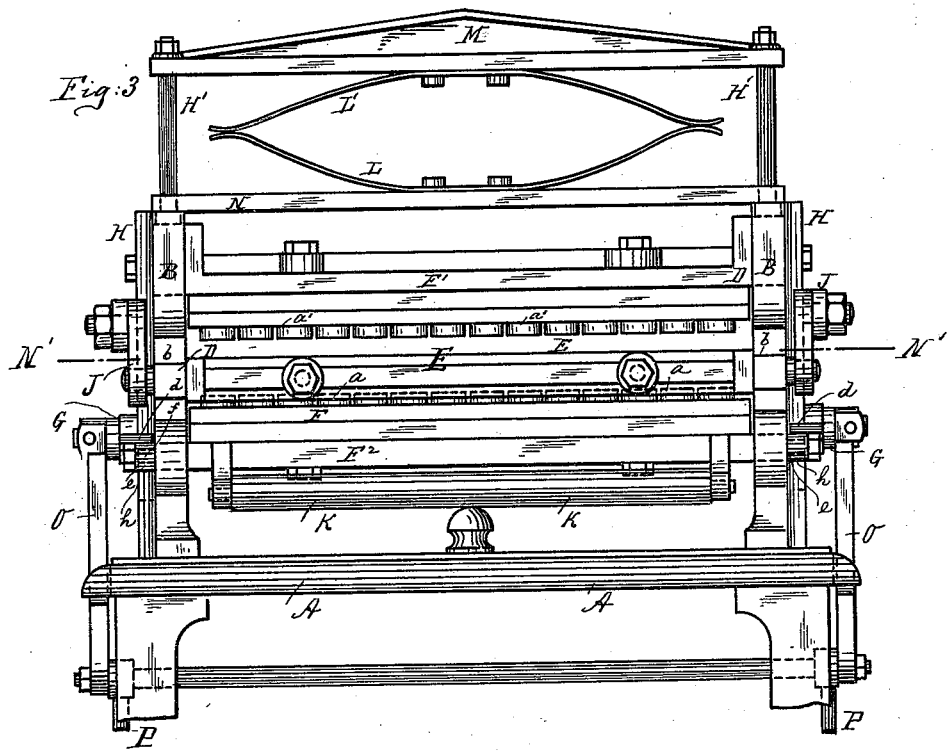
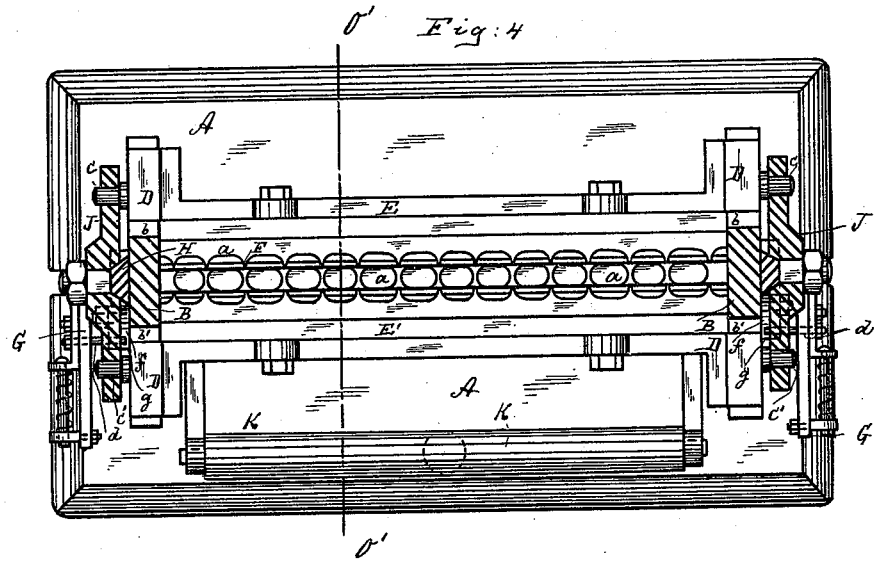
Witnesses:
William Schulz
John Becker
Inventor:
Paul Franke
by his attorneys
Roeder & Briesen (No Model.) 3 Sheets—Sheet 3.
P. FRANKE.
CANDY MACHINE.
No. 550,445. Patented Nov. 26, 1895.
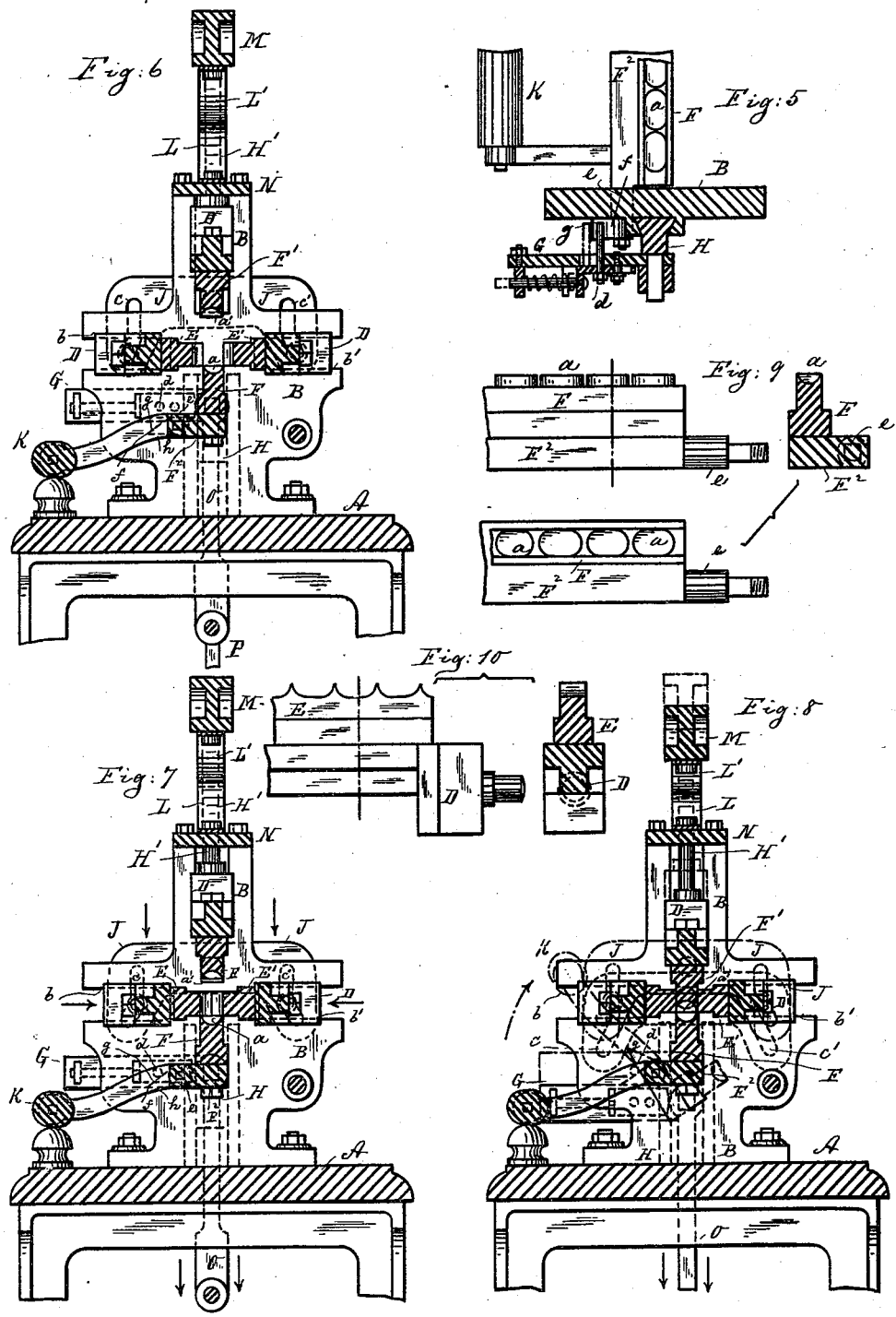
Witnesses.
William Schulz
John Becker
Inventor:
Paul Franke
by his attorneys
Roeder & Briesen

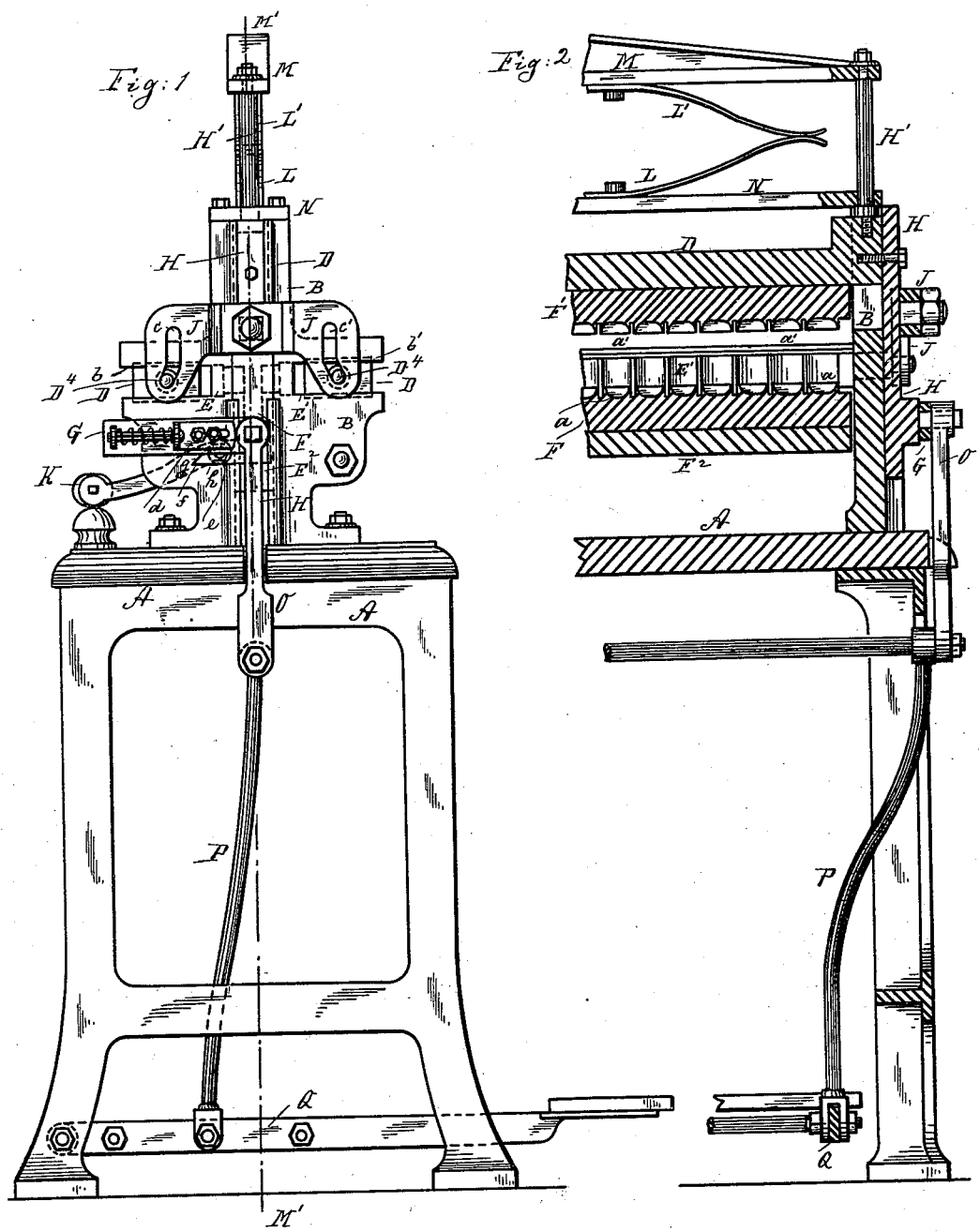

UNITED STATES PATENT OFFICE.

PAUL FRANKE, OF LEIPSIC, GERMANY.

CANDY-MACHINE.

SPECIFICATION forming part of Letters Patent No. 550,445, dated November 26, 1895.

Application filed April 23, 1894. Serial No. 508,591. (No model.) Patented in Germany February 8, 1891, No. 60,443.

*To all whom it may concern:*

Be it known that I, PAUL FRANKE, of Leipsic, Plagwitz, in the Kingdom of Saxony, Germany, have invented a new and useful Improvement in Candy-Machines, (for which I have obtained a patent in Germany, No. 60,443, dated February 8, 1891,) of which the following is a specification.

This invention relates to a machine for manufacturing candy, and more particularly for dividing and molding a body of candy to form either plain or filled plastic bonbons.

The machine comprises four parallel plungers that constitute the molds and cutters and which are adapted to divide and shape the soft body of candy placed between them. The finished bonbons are ejected from the machine by a peculiar discharging attachment.

In the accompanying drawings, Figure 1 is an end elevation of the machine; Fig. 2, a section through part of the machine on line M' M', Fig. 1; Fig. 3, a side elevation of the upper part of the machine; Fig. 4, a horizontal section on line N' N', Fig. 3; Fig. 5, a horizontal section through the tilting mechanism. Figs. 6, 7, and 8 are sections on line O' O', Fig. 4, showing the plungers in consecutive positions. Fig. 9 is a detail of fixed plunger F, and Fig. 10 a detail of plunger E.

The letter A represents the bed-plate of the machine, provided with a pair of uprights B, that serve to guide the blocks D. To these blocks are secured two horizontally-movable plungers E E', moving in guides $b$ $b'$, and an upper vertically-movable plunger F', while a fourth or lower plunger F is fixed—*i. e.*, not vertically movable. The plungers F F' are provided with the molds $a$ $a'$ to impart the proper shape to the candy, while the plungers E E' are corrugated, Fig. 10, to indent the candy laterally. The molds may of course be of such a form as to impart either a plain or an ornamental surface to the candy.

In order to operate the plungers E E' F', I employ a foot-lever Q, that transmits motion by draw-bar P and guide-bar O to a head H, carrying a slide J. This slide is provided with a pair of slots $c$ $c'$, that are vertical and parallel at their upper end, but diverge toward their lower end, Fig. 1, and which receive the gudgeons $D^4$ of blocks D. Upon the descent of the slide J the plungers E E' will first be drawn together as long as the gudgeons $D^4$ engage the diverging lower parts of the slots $c$ $c'$. As soon, however, as the gudgeons enter the straight portions of the slots the motion of the plungers will cease, although the slide J will continue its descent. During the downward movement of the slide the upper vertical plunger F' will descend, so that the body of candy which has been partly shaped by plungers E E' will be pressed into the molds and fully shaped by the plungers F F'.

In order to eject the properly-shaped candy, I attach to head H a lever G, Fig. 5, provided with a pin $d$, adapted to come into contact with the upper beveled face $g$ or the lower straight face $h$ of a nose $f$. This nose is attached to the support $F^2$ of plunger F, which support turns on a pivot $e$. Upon the descent of lever G no motion will be imparted by it to the nose; but during the ascent of the lever the pin $d$ will bear against the straight face $h$ of nose $f$, in order to vibrate the same. This will cause the support $F^2$, and consequently the plunger F, to be tilted so that the candy is thrown off such bar and out of the machine. Reaction of the ejecting attachment of course takes place after the plungers E E' F' have receded and have liberated the candy.

After the candy has been discharged in the manner described the parts F $F^2$ are righted by a counterweight K, secured to base $F^2$, and which comes into play as soon as the pin $d$ has passed the nose $f$. If desired, the ejecting mechanism may be omitted, in which case the weight K is operated by hand.

The upward motion of the head H and slide J is effected by a pair of spring L L', Fig. 2, which are secured to a fixed bar N and to a rail M, secured to an extension-rod H' of head H. These springs draw the head upward as soon as the ejecting-lever G has been liberated.

The plungers E E' and F F' may be readily removed and interchanged with other plungers provided with differently-arranged molds and cutters.

The machine is highly efficient, as by the motion of a single lever a large number of candies may be simultaneously shaped. Of course it may be driven either by hand or power.

What I claim is—

1. The combination in a candy machine of two laterally movable plungers, a vertically movable plunger, and a lower tilting plunger, substantially as specified.

2. The combination in a candy machine of a vertically movable plunger with a lower plunger, a pair of horizontally movable plungers, gudgeoned supports for the same, and a slide having slots that engage the gudgeons, substantially as specified.

3. The combination in a candy machine of a vertically movable plunger with a lower plunger, a pair of horizontally movable plungers having gudgeoned supports, a spring actuated head, a slide secured thereto and having diverging slots that are adapted to engage the gudgeons, substantially as specified.

4. The combination in a candy machine of head H, with slides J, having slots $c$, $c'$, that are parallel at the top and diverge at the bottom, plungers E E', blocks D, having gudgeons $D^4$, that engage said slots, an upper movable plunger F' secured to blocks D, and a lower fixed plunger, substantially as specified.

5. The combination in a candy machine of the movable plungers E, E', F', with a pivoted plunger F, tilting lever G, having pin $d$, and with support $F^2$, having nose $f$, that is engaged by said pin, substantially as specified.

In testimony whereof I have signed my name to this specification in the presence of two subscribing witnesses.

PAUL FRANKE.

Witnesses:
MAX MATTHÄI,
RUD. E. FRICKE.